(12) United States Patent
Koontz et al.

(10) Patent No.: US 6,845,392 B2
(45) Date of Patent: Jan. 18, 2005

(54) REMOTE SYSTEMS MANAGEMENT VIA DBMS STORED PROCEDURES AND ONE COMMUNICATION LINE

(75) Inventors: Wendy Lynne Koontz, Longmont, CO (US); Stanley Wong, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 09/732,070

(22) Filed: Dec. 7, 2000

(65) Prior Publication Data

US 2002/0073189 A1 Jun. 13, 2002

(51) Int. Cl.[7] ............................................. G06F 15/16
(52) U.S. Cl. ....................... 709/219; 709/202; 709/203; 709/217; 707/10
(58) Field of Search ................................ 709/202, 203, 709/217, 219, 200; 707/10

(56) References Cited

U.S. PATENT DOCUMENTS

| | | | |
|---|---|---|---|
| 5,657,447 A | * 8/1997 | Leung et al. ................... | 707/1 |
| 5,805,897 A | 9/1998 | Glowny ....................... | 395/712 |
| 5,881,232 A | * 3/1999 | Cheng et al. ................. | 709/217 |
| 5,974,416 A | * 10/1999 | Anand et al. .................. | 707/10 |
| 6,008,805 A | 12/1999 | Land et al. .................. | 345/335 |
| 6,012,100 A | 1/2000 | Frailong et al. ............ | 709/250 |
| 6,473,807 B1 | * 10/2002 | Hills et al. ................... | 719/330 |
| 6,487,547 B1 | * 11/2002 | Ellison et al. ................. | 707/2 |

* cited by examiner

Primary Examiner—Nabil El-Hady
(74) Attorney, Agent, or Firm—Sandra M. Parker, Esq.

(57) ABSTRACT

A method, apparatus and program storage device for monitoring and managing a remote computer in a computer network is provided. The apparatus includes a server computer system having a database management system for retrieving data from a database stored in an electronic storage device coupled to the server computer system, a console computer system for managing the server computer system, and only one communication line between the server and the console. The server computer system services the communication line via a database management system protocol. It receives server management operation requests from the console and returns the requested information to the console. When the server database management system recognizes the server management operation requests, sent in a stored procedure call format, it invokes an appropriate DBMS stored procedure encoding the requested server management operation.

16 Claims, 3 Drawing Sheets

REMOTE SYSTEMS MANAGEMENT VIA DBMS STORED PROCEDURES AND ONE COMMUNICATION LINE

BACKGROUND OF THE INVENTION

1. Field of the Invention

This invention relates in general to database management systems performed by computers, and in particular to an optimized remote computer system database monitoring and managing technique useable in a distributed computing environment.

2. Description of Related Art

The data processing resources of business organizations are increasingly taking the form of a distributed computing environment in which data and processing are dispersed over a network comprising many interconnected, heterogeneous and geographically remote computers. Some reasons for this approach are the need to offload non-mission-critical processing from the mainframe, to provide a pragmatic alternative to centralized corporate databases, to establish a single computing environment, to move control into the operating divisions of the company, and to avoid having a single point of failure. Many business entities have one client/server network installed in each regional office, in which a high-capacity computer system operates as the "server" supporting many lower-capacity "client" desktop computers. The servers in such a business entity are commonly connected to one another by a higher-level network known as a wide area network. In this manner, users at any location within the business entity can access resources available in the company's network regardless of where the resource is located.

Such systems require a method and apparatus for monitoring and managing the applications and resources on a distributed computer network. Therefore, in the distributed systems there is a need to remotely send external commands to access files, monitor and communicate information about the existence and status of resources, allow the exchange of information between the processors, query and update a database, or to execute recovery actions.

A procedure is needed for coordinating event management between the various computers throughout the network. Preferably, at least one manager software system runs on at least one of the networked computer systems designated as a network management computer system or "console" system. Typically, an "agent" software utility runs on each of the server computer systems in the network to be monitored. Each respective agent software utility carries out tasks on the computer system in which it is installed, such as discovering which resources and applications are present on the computer system, monitoring particular aspects of the resources and applications present on the computer system, and executing recovery actions automatically, when such actions are warranted. The agents are capable of intelligent, autonomous operation.

Database modules are stored in a non-volatile storage device at the site of each agent software utility and typically are loaded and unloaded into server memory dynamically as consoles register and de-register with the agents. Consoles may register to receive all information from the agents or only selected information.

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

In RDBMS software all data is externally structured into tables. The SQL interface allows users to formulate relational operations on the tables either interactively, in batch files, or embedded in host language, such as C, COBOL, etc. Operators are provided in SQL that allow the user to manipulate the data, wherein each operator operates on either one or two tables and produces a new table as a result. The power of SQL lies on its ability to link information from multiple tables or views together, to perform complex sets of procedures with a single statement. A Call statement of SQL is used to invoke stored procedures.

The RDBMS Control Center utility is a database administrator's tool, used to define tables, reorganize data and manage and remove data no longer needed. Whenever a request from the Control Center is submitted, such as a command defining a table, the processing information is generated as SQL statements. The statements may be run immediately, or saved in a file, which can be edited and the statements can be run at a later time by the Control Center. Deferred SQL files let a user customize the tasks for his application needs.

Remote systems management requires connectivity to be established between a console and a remote server system. Remote server management activities include software installation and upgrade, monitoring various aspects of the server system, and managing the configuration and files on the server system. The databases are usually managed by a database management system (DBMS). In this case, to accomplish the remote server management activities, the conventional remote management products require utilization of two separate management protocols, one for the database and another for the server operating system functions. They also use a communication protocol for connectivity purposes. The management protocol used for managing the server's operating system functions can be any established protocol based on an industry standard or a user's private protocol, which is used between the management console computer and the server management agent. The database DBMS protocol is typically a DB2® or Oracle protocol. The communication protocol is typically the TCP/IP, SNA or IPX protocol.

One problem associated with the simultaneous use of two types of management protocols is the presence of two communication lines, one for the database management and the other for the server operating system functions. The efficiency of communication functions is a key factor in any distributed database system performance, which can be enhanced by the elimination of the overhead for maintaining the second communication line, albeit leaving the only communication line with a heavier load.

While there have been various techniques developed for optimizing the remote systems management functions there is still a need in the art for further optimization techniques involving remote systems management. Therefore, it would be advantageous to provide a method for the computer that efficiently controls the server computer site, is easy to implement and maintain, and decreases the use of communication resources, such as sessions, between processors.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a method for monitoring and managing a remote server in a computer system network via a console, wherein one and only one communication line exists between the server and the console. The method has the steps of:

(a) servicing the communication line in the server via a server database management system protocol, by receiving server management operation requests from the console and returning the requested information to the console; and (b) using a server database management system for recognizing the server management operation requests being in a stored procedure call format, and for invoking an appropriate stored procedure encoding the requested server management operation, thereby avoiding use of a dedicated server management agent.

Another preferred embodiment of the present invention is an apparatus which includes a server computer system having a database management system for invoking procedure calls and retrieving data from a database stored in an electronic storage device coupled to the server computer system, a console computer system for managing the server computer system, and only one communication line between the server and the console. The server computer system receives server management operation requests from the console and returns the requested information to the console. When the server database management system recognizes the server management operation requests, sent in a stored procedure call format, it invokes an appropriate DBMS stored procedure encoding the requested server management operation.

Yet another preferred embodiment of the present invention is a program storage device for monitoring and managing a remote computer in a computer network, readable by a computer, tangibly embodying a program of instructions executable by the computer. It performs the steps of the method embodiment of the present invention for monitoring and managing a remote server in a computer system network via a console, wherein one and only one communication line exists between the server and the console.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized and structural and functional changes may be made without departing from the scope of the present invention.

The present invention discloses a method, apparatus and program storage device for monitoring and managing applications and other resources in a computer network. The method and system is preferably to be used in any distributed computing environment in which two or more computer systems are connected by a network, including environments in which the networked computers are of different types. At least one database manager software system is installed on and runs on at least one of the networked server computer systems. The network management computer systems act as consoles for monitoring and managing resources present on server computer systems in the network.

Figure 1:
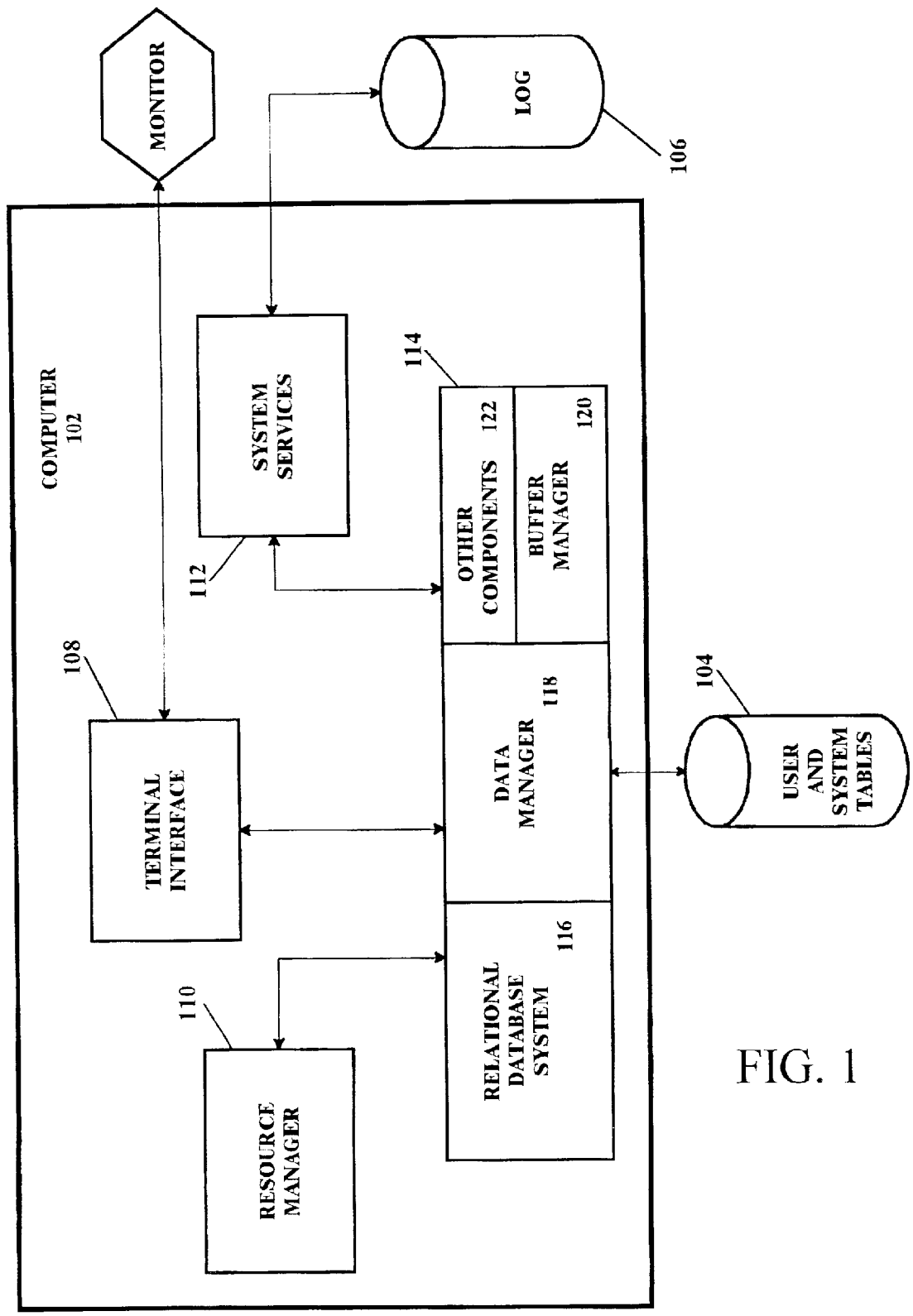
FIG. 1 illustrates a computer hardware and software environment usable in the present invention.

FIG. 1 illustrates an exemplary computer hardware environment, including a computer system 102 comprised of one or more processors executing instructions stored in its associated computer memory, that could be used with the present invention. The operating memory can be loaded with the instructions received through an optional storage drive or through an interface with the network. The technique is especially advantageous when used in a network environment, having at least a console on a console site with a processor networked to a server site with a processor.

Each processor is connected to one or more electronic storage devices 104 and 106, such as disk drives, that store one or more relational databases. These drives may comprise, for example, optical disk drives, magnetic tapes and/or semiconductor memory. The storage drive permits receipt of a program storage device, such as a magnetic media diskette, magnetic tape, optical disk, semiconductor memory and other machine-readable storage device, and for program steps recorded on the program storage device to be read and transferred into the computer memory. The recorded program instructions may include the code for the optimized technique of the present invention. Alternatively, the program steps can be received into the operating memory or over the network.

Operators of the computer system 102 use a standard operator terminal interface 108, such as IMS/DB/DC, CICS, TSO, OS/2 or other similar interface, to transmit electrical signals to and from the computer system 102, that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the OS390, AIX or OS/2 operating systems. Those skilled in the art will recognize, however, that the present invention has application to any RDBMS software that uses SQL, and may similarly be applied to non-SQL queries, which support remote procedure calls.

As illustrated in FIG. 1, the DB2 architecture for the OS390 operating system includes three major components: the Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets on the electronic storage device 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122, such as an SQL compiler/interpreter. These submodules support the functions of the SQL language, i.e., definition, access control, retrieval, and update of user and system data. The Database Services module 114 preferably comprises one or more processors that execute a series of computer-executable programming instructions to respond to a user query, which support remote procedure calls.

Figure 2:
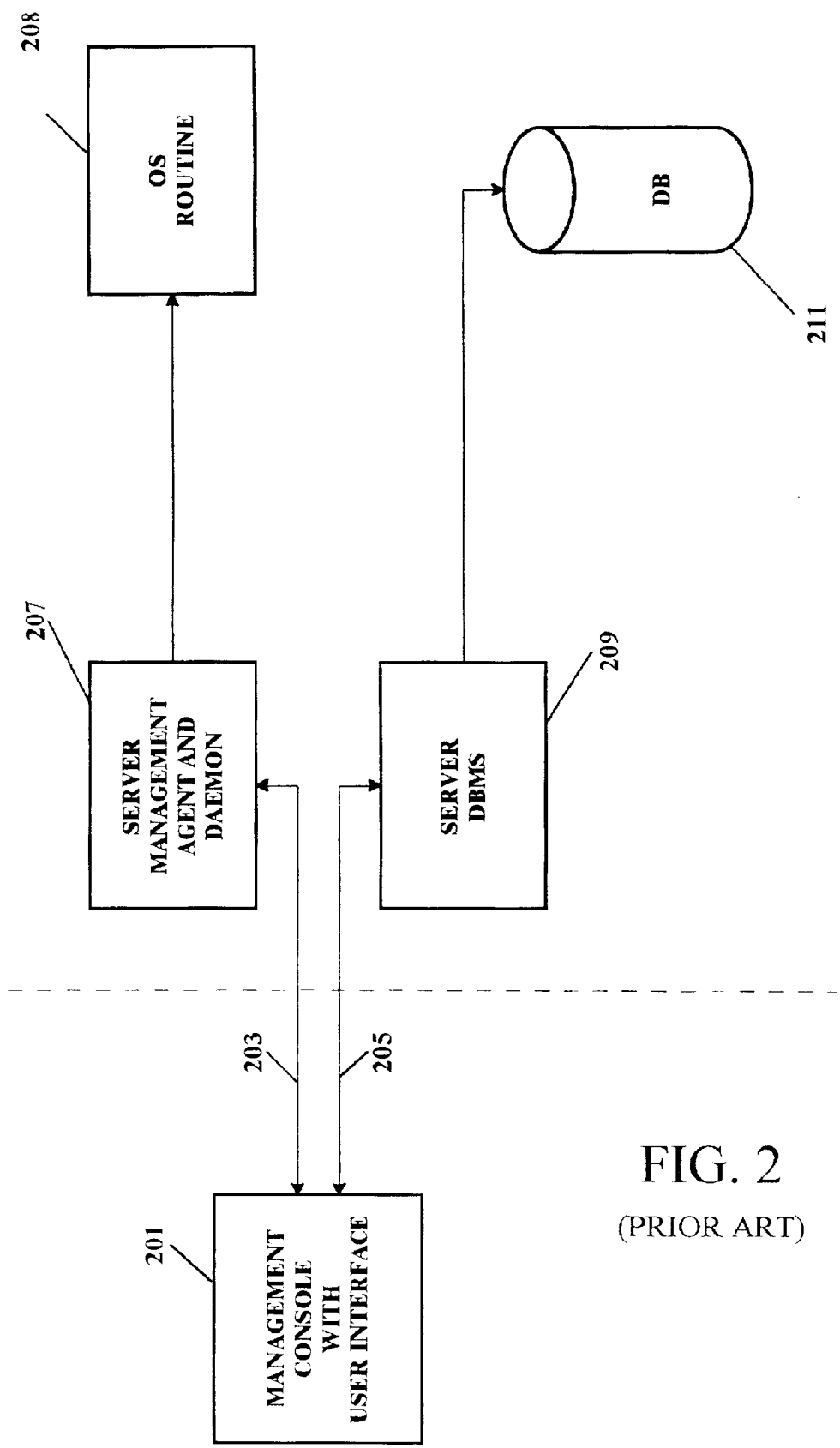
FIG. 2 illustrates a computer hardware and software environment enabling remote systems management according to the prior art.

FIG. 2 illustrates a computer hardware and software environment enabling remote systems management according to the prior art. In a conventional system, shown in FIG. 2, a console management software 201 has a user's interface capable of servicing both a server management protocol-based communication line 203 and a database protocol-based line 205. Both management protocols use a communication protocol, such as TCP/IP. The server management function commands are on the server site received by a management agent 207, which then invokes an appropriate operating system routine 208 or file I/O routine, to perform according to the request sent from to the console, and to return the requested information to the console. The database commands are sent on the separate line to the DBMS 209, and executed by that system via SQL commands to a database 211. Therefore, the conventional system requires two separate connections, one for the server management protocol and another for the database protocol.

The management agent software 207 is installed on and runs on each of the server computer systems in the network. Each respective management agent 207 carries out tasks on the computer system in which it is installed, such as discovering which resources and applications are present on the computer system, monitoring particular aspects of the resources and applications present on the computer system, and executing recovery actions automatically when such actions are warranted. Each management agent 207 is also able to carry on a dialog of communication with console manager software systems via the network, so that the consoles on the network management computer systems can provide a continuously updated display representing all resources and applications present throughout the network, as well as the state of each such resource or application.

Database modules are stored locally at the site of each server system on which a management agent 207 process is to run. Consoles register with the management agents 207, telling the agents which resources, parameters and events the console is interested in receiving information about. In response, the management agent 207 returns only the data that is necessary in providing the monitoring services required by the consoles' registrations.

In operation, the management agent 207 monitors the state of each resource registered to be monitored, as well as the state of certain default resources that are always to be monitored, and typically maintains a historical log both of events that have occurred and also of the values of individual parameters relevant to the resources. The agent 207 also sends messages to each console registered to receive information.

Figure 3:
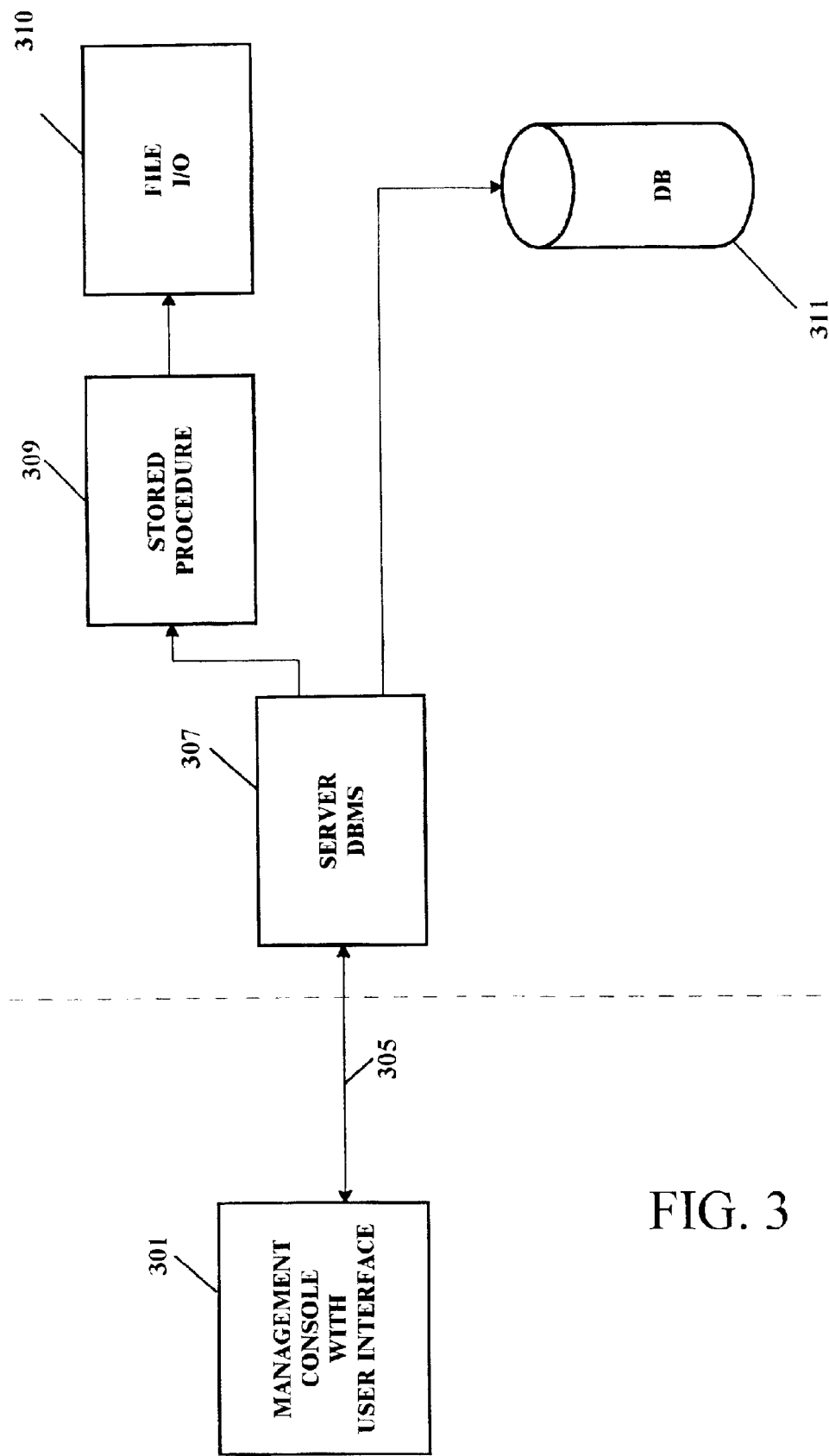
FIG. 3 illustrates a computer hardware and software environment enabling remote systems management according to the present invention.

FIG. 3 illustrates a computer hardware and software environment enabling remote systems management according to the present invention. A console management software 301 has a standard user's interface capable of servicing a database protocol-based line 305, via a communication protocol, such as TCP/IP. Both the database commands and server management function commands are on the server site received by a DBMS 307. The DBMS 307 recognizes a server management command because it is in a standard stored procedure call format. In that case it invokes one of stored procedures 309 to complete an appropriate operating system routine or file I/O routine 310, in order to perform a server management operation according to the request sent from to the console, and to return the requested information to the console. The database commands are executed by the DBMS 307, via SQL commands, to access a database 311.

The server file I/O routines are thus invoked in the present invention by the database management system 307, such as DB2. Particularly in DB2, the server I/O routines are invoked by the DB2 Control Center utility, preferably stored in the console. The stored procedures may perform numerous functions, such as dynamic allocation of file space for existing or newly created files, obtain and return file attributes, delete or rename files, return file status, return a list of files, perform diagnostic dump, rename a file, create a new file, perform recovery routines, stop a server system process, log off a server user, or monitor an activity or a parameter. The stored procedures may be run in a secured server work environment, if required.

Therefore, in the present invention there is only one connection, and no separate management protocol is needed for the server management function. The request created by the console management software 301 user interface routine is generated in the format of a stored procedure call, which can be executed by the standard DBMS 307, to invoke the stored procedure 309. Additionally, the information returned to the console is in the format of the standard DBMS table-based result set file, which is processed by the console system in the conventional way, and there is no need for a special user interface I/O routine within the console management software 301.

The present invention relies on the use of a database management protocol, including stored procedure calls, to perform the server management functions encoded in the stored procedures. The server management functions may include software and system configuration description, or monitoring and task automation. Thus, the present invention embodiments use the existing database management system protocol between the console and the server system to receive commands and initiate both the database and server management functions on the server system. Therefore, there is no need for a separate server management protocol to be used in the network distributed system of the present invention. The present invention only uses the database management system protocol, that is preferably based on an industry standard, which is robust and well defined, such as DRDA, ODBC or JDBC.

In DB2 UDB products for OS/390, the present invention also simplifies installation and management of the stored procedures 309 on the server system, by using the database stored procedure management function to dynamically create and delete a stored procedure 309, when the management request arrives at the server site. The stored procedure 309 preferably runs in the generalized secured stored procedures environment, if needed, and does not require a dedicated deamon to monitor the communications between the console and server, in expectation of a request. Thus, when the remote system has a database management system installed, the present invention removes the need to create a separate communication session solely for server management purposes. Elimination of this extra connection reduces overhead associated with this connection and eliminates a need for complex protocol routines needed for this purpose.

Reliance on stored procedure calls for server management functions simplifies the software installation and administrative functions. For example, the present invention embodiments remove the need to maintain a complex management agent on the remote server site, because it allows the existing database management system to handle access privileges and eliminates the need for data conversion between incompatible architectures, such as ASCII and EBCDIC.

Preferably, the present invention removes the need for a dedicated management agent utility deamon on the server site by exploiting the database manager's usage of dynamic workload management. In the present embodiments the deamons and their priority are typically managed dynamically by the operating system, which is in the best position to balance and schedule the load of the server system and the priority of the stored procedures being run for individual users.

The present invention works with any of the relational database products supported by IBM, such as DB2 for VM/VSE, DB2 for OS/390, DB2 for AS/400, DB2 Common Server, and DB2 Universal Database. It also works with non-IBM products, such as Oracle, Informix, Sybase, SQL Anywhere, and Microsoft SQL Server.

The present invention maintains rapid and timely remote site control, and minimizes the load on the network to initialize and maintain the remote site server. It may be applied to multivendor RDBMS, including Oracle, Sybase, Informix, Microsoft SQL Server, and others. It may be used with multidatabase servers that provide a single-site image to all data, relational and non-relational, local and remote, from IBM and non-IBM platforms, as though the data were local, regardless of the differences in SQL dialects, data access methods, networking protocols, and operating systems, in truly heterogeneous environments.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for monitoring and managing a remote server in a computer system network via a console, wherein one and only one communication line existing between the server and the console, the method comprising the steps of:
   (a) servicing said communication line in the server via a server database management system protocol, by receiving server management operation requests from the console and returning the requested information to the console; and
   (b) using a server database management system for recognizing the server management operation requests being in a stored procedure call format, and for invoking an appropriate stored procedure encoding the requested server management operation.

2. The method according to claim 1, wherein the request for the server management operation comprises one or more commands selected from a group comprising server operating system routines and file I/O routines.

3. The method according to claim 2, wherein the file I/O routines being invoked by the server DB2 database management system stored procedure calls.

4. The method according to claim 1, wherein the returned requested information having a database table format.

5. An apparatus for monitoring and managing a remote server computer in a computer network, comprising:

a server computer system (server) having a database management system for invoking stored procedure calls and retrieving data from a database stored in an electronic storage device coupled to the server computer system;

a console computer system (console) for managing the server computer system; and one and only one communication line between the server and the console, said line being serviced in the server via a database management system protocol, wherein said communication line transferring from the console requests for both the server database management system operations and the server management operations, and returning the requested information to the console.

6. The apparatus according to claim 5, wherein the request for the server management operation comprises one or more commands selected from a group comprising server operating system routines and file I/O routines.

7. The apparatus according to claim 6, wherein the file I/O routines being invoked by the server DB2 database management system stored procedure calls.

8. The apparatus according to claim 5, wherein the returned requested information having a database table format.

9. An apparatus for monitoring and managing a remote server computer in a computer network, comprising:

a server computer system (server) having a database management system for invoking stored procedure calls and retrieving data from a database stored in an electronic storage device coupled to the server computer system;

a console computer system (console) for managing the server computer system;

one and only one communication line between the server and the console;

means, performed by the server computer system, for servicing said communication line in the server via a database management system protocol, and for receiving server management operation requests from the console and returning the requested information to the console; and means, performed by the server database management system, for recognizing the server management operation requests being in a stored procedure call format, and for invoking an appropriate stored procedure encoding the requested server management operation.

10. The apparatus according to claim 9, wherein the request for the server management operation comprises one or more commands selected from a group comprising server operating system routines and file I/O routines.

11. The apparatus according to claim 10, wherein the file I/O routines being invoked by the server DB2 database management system stored procedure calls.

12. The apparatus according to claim 9, wherein the returned requested information having a database table format.

13. A program storage device readable by a computer tangibly embodying a program of instructions executable by the computer to perform method steps for monitoring and managing a remote server in a computer system network via a console, wherein one and only one communication line existing between the server and the console, the method comprising the steps of:
   (a) servicing said communication line in the server via a server database management system protocol, by receiving server management operation requests from the console and returning the requested information to the console; and (b) using the server database management system for recognizing the server management operation requests being in a stored procedure call format, and for invoking an appropriate stored procedure encoding the requested server management operation.

14. The method according to claim 13, wherein the request for the server management operation comprises one or more commands selected from a group comprising server operating system routines and file I/O routines.

15. The method according to claim 14, wherein the file I/O routines being invoked by the server DB2 database management system stored procedure calls.

16. The method according to claim 13, wherein the returned requested information having a database table format.

* * * * *